(12) United States Patent
Higashikawa

(10) Patent No.: US 10,723,904 B2
(45) Date of Patent: Jul. 28, 2020

(54) DECORATIVE MATERIAL

(71) Applicant: TOPPAN PRINTING CO., LTD., Tokyo (JP)

(72) Inventor: Eiichi Higashikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/385,706

(22) Filed: Apr. 16, 2019

(65) Prior Publication Data

US 2019/0241759 A1    Aug. 8, 2019

Related U.S. Application Data

(63) Continuation of application No. PCT/JP2017/039824, filed on Nov. 2, 2017.

(30) Foreign Application Priority Data

Nov. 2, 2016 (JP) .................................. 2016-215189

(51) Int. Cl.
*C09D 11/54* (2014.01)
*D21H 27/18* (2006.01)
(Continued)

(52) U.S. Cl.
CPC ................ *C09D 11/54* (2013.01); *B05D 5/02* (2013.01); *B32B 27/00* (2013.01); *B32B 27/18* (2013.01); *C09D 11/037* (2013.01); *C09D 11/107* (2013.01); *D21H 19/38* (2013.01); *D21H 19/40* (2013.01); *D21H 19/82* (2013.01); *D21H 21/28* (2013.01); *D21H 21/52* (2013.01);
(Continued)

(58) Field of Classification Search
CPC ........... C09D 11/02; C09C 1/28; C09C 3/063; Y10T 428/24876
USPC ...................................................... 428/195.1
See application file for complete search history.

(56) References Cited

U.S. PATENT DOCUMENTS 5,169,715 A    12/1992  Maubert et al.
2001/0046594 A1*  11/2001  Takemoto ................. B44C 1/10
                                                                428/203
(Continued)

FOREIGN PATENT DOCUMENTS

EP            1 803 553 A1     7/2007
JP            H08-300595 A    11/1996
(Continued)

OTHER PUBLICATIONS

International Searching Authority, "International Search Report," issued in connection with International Patent Application No. PCT/JP2017/039824, dated Jan. 23, 2018.
(Continued)

*Primary Examiner* — Betelhem Shewareged
(74) *Attorney, Agent, or Firm* — Foley & Lardner LLP

(57) ABSTRACT

A decorative material having first and second gloss-adjusting layers, one with lower gloss contains a matting agent having an average particle diameter of 6.0 μm or more and 15.0 μm or less. That is, the average particle diameter of the matting agent in the gloss-adjusting layer with lower gloss, i.e., the gloss-adjusting layer whose scratch resistance is likely to be low, is set within an optimal range in which the gloss-adjusting layer has improved or even excellent scratch resistance and designability.

13 Claims, 1 Drawing Sheet

(51) Int. Cl.
*D21H 19/40* (2006.01)
*D21H 19/38* (2006.01)
*D21H 19/82* (2006.01)
*E04F 13/07* (2006.01)
*E04F 13/08* (2006.01)
*D21H 21/52* (2006.01)
*D21H 21/28* (2006.01)
*B32B 27/00* (2006.01)
*B32B 27/18* (2006.01)
*B05D 5/02* (2006.01)
*C09D 11/037* (2014.01)
*C09D 11/107* (2014.01)
*C09C 3/06* (2006.01)
*C09C 1/28* (2006.01)
*C09D 11/02* (2014.01)

(52) U.S. Cl.
CPC .............. *D21H 27/18* (2013.01); *E04F 13/07* (2013.01); *E04F 13/08* (2013.01); *E04F 13/0866* (2013.01); *E04F 13/0873* (2013.01); *C09C 1/28* (2013.01); *C09C 3/063* (2013.01); *C09D 11/02* (2013.01); *Y10T 428/24876* (2015.01)

(56) References Cited

U.S. PATENT DOCUMENTS

2007/0048505 A1* 3/2007 Shimada ................. B44C 1/10
　　　　　　　　　　　　　　　　　　　　　　　　428/195.1
2008/0038544 A1　2/2008 Kitaike et al.
2019/0241759 A1* 8/2019 Higashikawa ........... B05D 5/02

FOREIGN PATENT DOCUMENTS

JP　　　2001-315286 A　　11/2001
JP　　　　3629964 B2　　　3/2005

OTHER PUBLICATIONS

International Searching Authority, "Written Opinion," issued in connection with International Patent Application No. PCT/JP2017/039824, dated Jan. 23, 2018.
Extended European Search Report issued on PCT/JP2017039824 dated Aug. 19, 2019 (5 pages).

* cited by examiner

DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/039824, filed on Nov. 2, 2017, which is based upon and claims the benefit of priority to Japanese Patent Application No. 2016-215189, filed on Nov. 2, 2016; the disclosures of which are all incorporated herein by reference in their entireties.

TECHNICAL FIELD

The present invention relates to a decorative material for use in interior and exterior finishes of buildings, and surface decoration of fittings, furniture, etc. More specifically, the present invention relates to a decorative material that three-dimensionally expresses unevenness due to a difference in surface gloss.

BACKGROUND ART

Decorative materials are used for interior and exterior finishes of buildings, and surface decoration of fittings, furniture, etc. For example, decorative materials for such uses have design patterns, such as wood grain patterns and grain patterns. Moreover, decorative materials that not only two-dimensionally express design patterns, such as wood grain patterns and grain patterns, but also three-dimensionally express the impression of unevenness of the surface of natural wood materials or stone materials, have also been widely used mainly for applications for which a high-quality impression is desired.

As a method for expressing an impression of three-dimensional unevenness together with a two-dimensional design pattern on the surface of decorative materials, various methods have been conventionally devised, and separately used depending on the purpose. In particular, there is a method for visually expressing three-dimensional unevenness by taking advantage of optical illusions by changing the surface gloss state (specifically glossiness) of portions to be expressed as recesses or projections, rather than actually forming unevenness on the surface of the decorative material. According to this method, even if there is actually no unevenness, the human eye recognizes portions with higher gloss as projections, and portions with lower gloss as recesses.

Specifically, for example, a transparent or translucent synthetic coating material layer with low gloss is formed on the entire print surface of a substrate on which suitable patterns, including a recessed pattern, are printed. Then, a transparent or translucent synthetic coating material layer with high gloss is formed on portions of the surface of the formed synthetic coating material layer other than portions corresponding to the recessed pattern. Of course, a decorative material in which the unevenness relationship is reversed can be obtained by reversing the height relationship of gloss.

This method does not require special chemicals etc., and can easily impart an impression of three-dimensional unevenness to any substrates only by preparing two types of coating materials with different glosses. In addition, synthetic coating material layers with different glosses can be formed by a known printing method, such as a gravure printing method, after the formation of a design pattern (a pattern ink layer); thus, special facilities are not required, production efficiency is high, and synchronization with the design pattern is easy. Moreover, the thickness of the synthetic coating material layer is much thinner than the height difference of unevenness to be expressed; thus, the amount of resin used can be reduced, there is an advantage in terms of flexibility, and a decorative material having improved or even excellent bending processability can be easily realized. There is another advantage that contaminants do not remain in recesses because there is no large unevenness on the surface of the decorative material.

In consideration of these many advantages, decorative materials using this method have already been used; however, in terms of high-quality impression, there are no methods better than methods for actually forming unevenness. The reason for this is considered to be as follows. For example, a mechanical embossing method can faithfully reproduce unevenness, such as natural wood vessels, including the cross-sectional shape of the vessels etc. In contrast, in this method using two types of coating materials with different glosses, the surface has two variations of glosses; thus, only two variations of unevenness are expressed. Accordingly, there is a problem that it is difficult to express unevenness having an inclined portion with continuously varying depth (height), such as natural wood vessels.

In light of the above, there have recently been proposals for decorative materials that can express unevenness having an inclined portion, such as natural wood vessels, by providing a synthetic coating material layer that expresses unevenness having an inclined portion with continuously varying depth (hereinafter also referred to as a "gloss-adjusting layer") (see, for example, PTL 1).

CITATION LIST

[Patent Literature] PTL 1: JP 3629964 B2

SUMMARY OF THE INVENTION

Technical Problem

Here, as a general method for adjusting the gloss of the gloss-adjusting layer, a matting agent is added to a transparent resin, which is used as a binder. Fine particles of an inorganic material or organic material are mainly used as matting agents. In particular, inorganic material fine particles (particularly silica fine particles) have high matting ability and are widely used. Due to the addition of a matting agent, the matting agent imparts unevenness to the surface of the gloss-adjusting layer, and light is scattered on the uneven surface, thereby obtaining a matting effect. Desired gloss can be freely obtained by controlling the type and amount of such a matting agent.

However, it is known that when a gloss-adjusting layer using a matting agent is used, scratch resistance is lowered due to scratching of projections on the surface caused by contact with external objects, and due to removal of the matting agent. Accordingly, it has been difficult to satisfy, for example, high scratch resistance required for top boards and shelf boards of furniture.

The present invention was made focusing on the above points. An object of the present invention is to provide a decorative material having improved or even excellent scratch resistance and designability.

Proposed Improvement or Solution to Problem

As a result of extensive studies, the inventors of the present invention found that a gloss-adjusting layer can have improved or even excellent scratch resistance and designability by setting the average particle diameter of the matting agent in the gloss-adjusting layer within the range of 6.0 μm or more and 15.0 μm or less. The inventors also found that the scratch resistance and designability of the entire decorative material can be improved by setting the average particle diameter of a matting agent contained in a gloss-adjusting layer with lower gloss, i.e., a gloss-adjusting layer whose scratch resistance is likely to be low, within such a range, so that a decorative material having improved or even excellent scratch resistance and designability can be provided.

In order to improve or solve the above problems, one embodiment of the present invention is a decorative material including a first gloss-adjusting layer provided on a substrate, and a second gloss-adjusting layer partially provided on the first gloss-adjusting layer, and having gloss that is different from that of the first gloss-adjusting layer; characterized in that, of the first gloss-adjusting layer and the second gloss-adjusting layer, at least one with lower gloss contains a matting agent, where the matting agent contained in the gloss-adjusting layer with lower gloss has an average particle diameter of 6.0 μm or more and 15.0 μm or less; and the gloss-adjusting layer with lower gloss has a thickness of 1 μm or more and 18 μm or less, where the thickness is 1.2 times or less the particle diameter of the matting agent contained in the gloss-adjusting layer with lower gloss.

Desired Advantageous Effects of the Invention

According to one embodiment of the present invention, a decorative material having improved or even excellent scratch resistance and designability can be provided by setting the average particle diameter of a matting agent contained in a gloss-adjusting layer with lower gloss within an optimal range.

DESCRIPTION OF REPRESENTATIVE EMBODIMENTS

Figure 1:
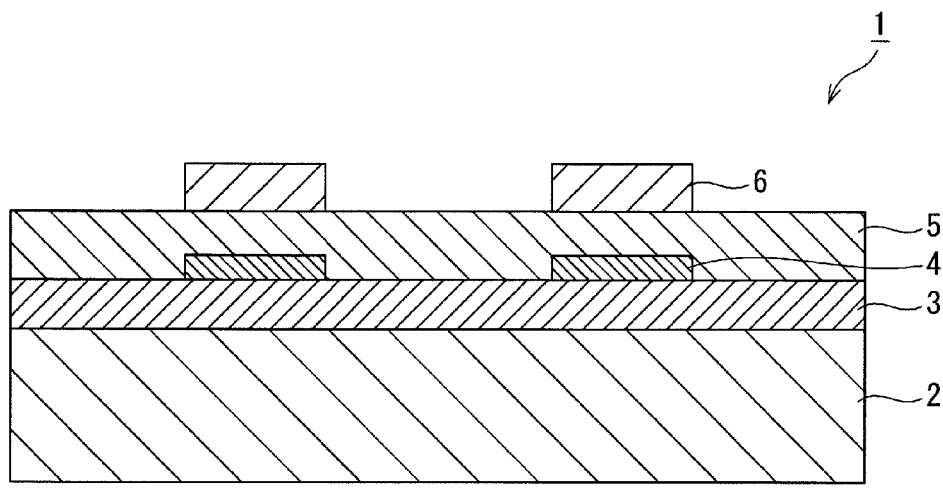
FIG. 1 is a cross-sectional view showing a decorative material according to an embodiment.

With reference to the drawings, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., are different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

A decorative material 1 according to an embodiment of the present invention is described with reference to the drawings.

(Structure)

As shown in FIG. 1, the decorative material 1 of the present embodiment includes a first gloss-adjusting layer 5 provided on a substrate 2, and a second gloss-adjusting layer 6 partially provided on the first gloss-adjusting layer 5, and having gloss different from that of the first gloss-adjusting layer 5. It is important that, of these first and second gloss-adjusting layers 5 and 6, one with lower gloss contains a matting agent having an average particle diameter in the range of 6.0 μm or more and 15.0 μm or less. Because the scratch resistance of the gloss-adjusting layer with lower gloss can be thereby improved, a decorative material 1 having improved or even excellent designability and scratch resistance can be provided.

The decorative material 1 may have a configuration in which other layers, such as a base solid ink layer 3, a pattern ink layer 4, and a transparent resin layer (not shown), may be disposed between the substrate 2 and the first gloss-adjusting layers 5, as described later.

(Substrate)

The substrate 2 is not limited, as long as it is usable as base paper for the decorative material 1. Examples of the substrate 2 include paper, woven fabrics, non-woven fabrics, synthetic resin-based substrates, wooden substrates, inorganic substrates, metal-based substrates, composite materials and laminates thereof; and other conventionally known materials. Examples of paper include tissue paper, resin-mixed paper, titanium paper, resin-impregnated paper, flame-resistant paper, inorganic paper, and the like. Woven fabrics or non-woven fabrics are made of natural fibers or synthetic fibers. Examples of synthetic resin-based substrates include those including homo or random polypropylene resins, polyolefin resins such as polyethylene resin, copolymerized polyester resins, crystalline polyester resins in an amorphous state, polyethylene naphthalate resins, polybutylene resins, acrylic-based resins, polyamide resins, polycarbonate resins, polyvinyl chloride resins, polyvinylidene chloride resins, fluororesins, and the like. Examples of wooden substrates include wood veneer, sliced veneer, plywood, laminate lumber, particle board, medium density fiberboard, and the like. Examples of inorganic substrates include gypsum plates, cement plates, calcium silicate plates, pottery plates, and the like. Examples of metal-based substrates include iron, copper, aluminum, stainless steel, and the like.

Moreover, the shape of the substrate 2 can be, for example, a film shape, a sheet shape, a plate shape, a profile molded article, or the like.

(Base Solid Ink Layer)

The base solid ink layer 3 is provided between the substrate 2 and the pattern ink layer 4, and is a layer covering the entire surface of the substrate 2 on the first gloss-adjusting layer 5 side, depending on the desired design. Moreover, the base solid ink layer 3 may be a multilayer of two or more layers, if necessary, to achieve masking properties etc. Furthermore, the base solid ink layer 3 may be formed by laminating as many layers as necessary for expression of the desired design. Thus, the base ink layer 3 can have various forms depending on the desired design, i.e., design to be expressed, by combination with the pattern ink layer 4; however, they are not limited.

The constituent material of the base solid ink layer 3 is not limited. For example, printing ink in which a matrix and a coloring agent, such as dye or pigment, are dissolved and dispersed in a solvent, or a coating agent, can be used. Examples of the matrix include various synthetic resins, such as oily nitrocellulose resin, two-component urethane resin, acrylic-based resin, styrene-based resin, polyester-based resin, urethane-based resin, polyvinyl-based resin, alkyd resin, epoxy-based resin, melamine-based resin, fluororesin, silicone-based resin, and rubber-based resin; mixtures thereof, copolymers thereof, etc. Further, examples of the coloring agent include inorganic pigments, such as carbon black, titanium white, zinc white, rouge, chrome yellow, Prussian blue, and cadmium red; organic pigments, such as azo pigments, lake pigments, anthraquinone pigments, phthalocyanine pigments, isoindolinone pigments, and dioxazine pigments; and mixtures thereof. Moreover, usable examples of the solvent include toluene, xylene, ethyl acetate, butyl acetate, methyl alcohol, ethyl alcohol, isopropyl alcohol, acetone, methyl ethyl ketone, methyl isobutyl ketone, cyclohexanone, water, and mixtures thereof.

Further, in order to impart various functions, functional additives, such as an extender pigment, a plasticizer, a dispersant, a surfactant, a tackifier, an adhesive aid, a drying agent, a curing agent, a curing accelerator, and a curing retarder, may be added to the base solid ink layer 3.

Each of the base solid ink layer 3, the pattern ink layer 4, and the first and second gloss-adjusting layers 5 and 6 can be formed by various printing methods, such as a gravure printing method, an offset printing method, a screen-printing method, an electrostatic printing method, and an ink-jet printing method. Moreover, because the base solid ink layer 3 and the first gloss-adjusting layer 5 cover the entire surface of the substrate 2 on the first gloss-adjusting layer 5 side, they can be formed by various coating methods, such as a roll coating method, a knife coating method, a microgravure coating method, and a die coating method. These printing methods and coating methods may be selected separately depending on the layer to be formed, or the same method may be selected to carry out combined processing.

(Pattern Ink Layer)

The pattern ink layer 4 is provided between the substrate 2 and the first gloss-adjusting layer 5, and is a layer for adding a design pattern to the decorative material 1. Usable examples of the design pattern include wood grain patterns, grain patterns, sand patterns, tiling patterns, brick patterns, fabric patterns, grain leather patterns, geometric patterns, and the like. In FIG. 1, the pattern ink layer 4 is formed only in a portion directly below the position in which the second gloss-adjusting layer 6 is formed. In other words, the second gloss-adjusting layer 6 is formed only in a portion overlapping the pattern ink layer 4. That is, the design pattern of the pattern ink layer 4 is synchronized with the gloss of the second gloss-adjusting layer 6. In the decorative material 1 of the present embodiment, the designability due to the second gloss-adjusting layer 6 can be thereby added to the designability due to the pattern ink layer 4. Therefore, the decorative material 1 of the present embodiment can have a high-grade design expression close to that of natural wood or natural stone.

The present embodiment shows an example in which the second gloss-adjusting layer 6 is formed only in a portion overlapping the pattern ink layer 4, that is, the second gloss-adjusting layer 6 is formed only in a portion directly above the pattern ink layer 4; however, other structures can also be employed. For example, the second gloss-adjusting layer 6 may be formed in a portion overlapping the pattern ink layer 4; in addition to the portion directly above the pattern ink layer 4, the second gloss-adjusting layer 6 may be formed in partial portions other than the right above portion.

The constituent material of the pattern ink layer 4 is not especially limited. For example, as with the base solid ink layer 3, printing ink in which a matrix and a coloring agent, such as dye or pigment, are dissolved and dispersed in a solvent, or a coating agent, can be used. Further, in order to impart various functions, for example, functional additives, such as an extender pigment, a plasticizer, a dispersant, a surfactant, a tackifier, an adhesive aid, a drying agent, a curing agent, a curing accelerator, and a curing retarder, may be added to the pattern ink layer 4.

(First and Second Gloss-Adjusting Layers)

The first gloss-adjusting layer 5 is provided on the base solid ink layer 3 and the pattern ink layer 4, and is a layer for adjusting the gloss state of the surface of the decorative material 1. The first gloss-adjusting layer 5 is formed on the entire surface of the base solid ink layer 3 and the pattern ink layer 4, and covers the entire surface of the substrate 2 on the front side of the decorative material 1. Moreover, the second gloss-adjusting layer 6 is provided on the first gloss-adjusting layer 5. The second gloss-adjusting layer 6 has gloss different from that of the first gloss-adjusting layer 5, and is a layer for adjusting the gloss state of the surface of the decorative material 1. The second gloss-adjusting layer 6 is formed in part of the surface of the first gloss-adjusting layer 5 on the front side of the decorative material 1. The decorative material 1 can express unevenness due to the difference in gloss between the first and second gloss-adjusting layers 5 and 6.

Moreover, of the first and second gloss-adjusting layers 5 and 6, at least one with lower gloss contains a matting agent. The amount of the matting agent is preferably 5 parts by mass or more and 40 parts by mass or less relative to 100 parts by mass of the resin composition. The amount of the matting agent is more preferably 10 parts by mass or more and 30 parts by mass or less. If the amount of the matting agent is less than 5 parts by mass, the matting effect is insufficient; thus, the gloss difference from the gloss-adjusting layer with higher gloss is reduced, so that the impression of unevenness is insufficient. In contrast, if the amount of the matting agent is larger than 40 parts by mass, the resin composition is relatively insufficient with respect to the amount of the matting agent, thereby resulting in loss of the matting agent, and reduction in scratch resistance due to the removal of the matting agent, so that the durability required for the decorative material 1 is severely impaired.

It is also possible that the gloss-adjusting layer with higher gloss contains any matting agent. These should be suitably adjusted according to the final requirements of unevenness and designability. The matting agent and the resin composition used in the first and second gloss-adjusting layers 5 and 6 may be the same or different. These can be freely selected depending on the requirements of unevenness and various characteristics demanded.

The average particle diameter of the matting agent contained at least in the gloss-adjusting layer with lower gloss is 6.0 µm or more and 15.0 µm or less. If the average particle diameter is less than 6.0 µm, due to the overly small average particle diameter, external objects are easily brought into contact with the resin parts of the first and second gloss-adjusting layers 5 and 6. Thus, sufficient scratch resistance may not be obtained. In contrast, if the average particle diameter is more than 15.0 µm, due to the overly large average particle diameter, the exposure of the matting agent from the surfaces of the first and second gloss-adjusting layer 5 and 6 increases, so that the matting agent is easily removed. Thus, sufficient scratch resistance may not be obtained. Moreover, if the average particle diameter is more than 15.0 µm, light scattering on the surfaces of the first and second gloss-adjusting layers 5 and 6 is large, which leads to cloudiness in the first and second gloss-adjusting layers 5 and 6; and visual particle recognition is increased, so that the impression of unevenness due to the difference in gloss is impaired. Thus, sufficient designability may not be obtained.

The particle diameter may be a value obtained by particle size distribution measurement of the matting agent used, or obtained by actually measuring the particle diameter of the matting agent by cross-sectional observation of the obtained decorative material 1. If the particle shape of the matting agent is not spherical, the shape may be considered to be an ellipsoid, and the average of the major and minor axes may be used as the particle diameter.

As the matting agent, a commercially available known matting agent can be used. For example, fine particles of an inorganic material, such as silica, glass, alumina, calcium carbonate, barium sulfate, or acrylic, can be used as the matting agent. Because the first and second gloss-adjusting layers 5 and 6 are required to have high transparency, it is particularly preferable to use fine particles of silica, glass, or acrylic, which have high transparency. In particular, among silica fine particles, a matting agent with a low bulk density in which fine primary particles undergo secondary aggregation has a higher matting effect relative to the addition amount, than solid spherical particles. Thus, a gloss-adjusting layer with lower gloss can be formed using such a matting agent. Accordingly, the difference in gloss between the first gloss-adjusting layer 5 and the second gloss-adjusting layer 6 can be increased, and the impression of unevenness to be obtained can be enhanced. An improved or even excellent design expression of greater depth can be thereby achieved.

Examples of the resin part (resin composition) that constitutes the first and second gloss-adjusting layers 5 and 6 include polyurethane-based resins, acrylic silicon-based resins, fluorine-based resins, epoxy-based resins, vinyl-based resins, polyester-based resins, melamine-based resins, amino-alkyd-based resins, urea-based resins, and the like. Moreover, the resin composition may be in the form of an aqueous solution, an emulsion, a solvent, or the like, and the form of the resin composition is not limited. Furthermore, as the method for curing the resin composition, for example, a one-component curing agent or a two-component curing agent, or an ultraviolet curing method, can be used.

The resin composition is preferably a urethane-based resin using isocyanate in terms of workability, price, cohesive force of the resin itself, etc. Usable examples of the isocyanate include curing agents, such as adduct products, biuret products, and isocyanurate products, which are derivatives of tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), methylhexane diisocyanate (HTDI), bis(isocyanatomethyl)cyclohexane (HXDI), trimethylhexamethylene diisocyanate (TMDI), etc.

Among these, for applications for which weather resistance is required, it is preferable to use hexamethylene diisocyanate (HMDI) having a linear molecular structure. For applications for which surface hardness is required, it is preferable to use isophorone diisocyanate (IPDI). Furthermore, it is also effective to use a mixture of hexamethylene diisocyanate (HMDI) and isophorone diisocyanate (IPDI) in order to combine their advantages. In addition, in order to improve surface hardness, it is preferable to use a resin that can be cured by active energy rays, such as ultraviolet rays or electron rays. These resins can be used in combination with each other.

The thickness of the first and second gloss-adjusting layers 5 and 6 can be any numerical value. However, when a matting agent is used, the average particle diameter of the matting agent is preferably 6.0 µm or more and 15.0 µm or less, as described above; thus, the thickness of the first and second gloss-adjusting layers 5 and 6 is preferably 1 µm or more and 18 µm or less, and is further preferably 1.2 times or less the particle diameter of the matting agent. Part of the matting agent can be thereby exposed from the surface. The thickness can be obtained by measuring the length of the resin part between the matting agents in several portions, and averaging the obtained values. As the particle diameter for determining a thickness that is 1.2 times or less the particle diameter of the matting agent, for example, the average particle diameter of the contained matting agent is employed. Whether the thickness is actually 1.2 times or less the particle diameter may be examined by, for example, measuring the particle diameter of a plurality of (e.g., 100 or more) matting agent particles present in a cross-section cut from the gloss-adjusting layer, and averaging the measured values.

When a matting agent is present, in terms of prevention of removal of the matting agent, the thickness of the first and second gloss-adjusting layers 5 and 6 is preferably ⅓ or more of the particle diameter of the matting agent. As the particle diameter for determining a thickness that is ⅓ or more of the particle diameter of the matting agent, for example, the average particle diameter of the contained matting agent is employed. Whether the thickness is actually ⅓ or more of the particle diameter may be examined by, for example, measuring the particle diameter of a plurality of (e.g., 100 or more) matting agent particles present in a cross-section cut from the gloss-adjusting layer, and averaging the measured values.

Moreover, the first and second gloss-adjusting layers 5 and 6 are layers on the outermost surface of the decorative material 1, and are thus required to have surface physical properties, such as abrasion resistance, scratch resistance, solvent resistance, and contamination resistance, which are required for the decorative material 1. Of these properties, abrasion resistance and scratch resistance are influenced by the thickness, and a higher thickness is advantageous. Therefore, when a matting agent is contained, the thickness of the first and second gloss-adjusting layers 5 and 6 is more preferably 2 µm or more and 12 µm or less. If the thickness is less than 1 µm, abrasion resistance and scratch resistance are significantly reduced; thus, the use as the decorative material 1 may be limited. In contrast, if the thickness is larger than 18 µm, the flexibility of the first and second gloss-adjusting layers 5 and 6 themselves is reduced when a matting agent is contained; thus, the processability as the decorative material 1 may be deteriorated.

As a method for adjusting the thickness of the first and the second gloss-adjusting layers 5 and 6, for example, the coating amount may be adjusted in the above printing methods and coating methods. The coating amount can be calculated by producing a product in which the gloss-adjusting layers 5 and 6 are formed on the substrate 2, and a product in which these layers are not formed in the various printing methods and coating methods, and determining the coating amount from their mass difference.

Furthermore, in order to impart various functions, functional additives, such as an antimicrobial agent and an antifungal agent, may be added to the first and second gloss-adjusting layers 5 and 6. Moreover, an ultraviolet absorber and a light stabilizer may be added, if necessary. Usable examples of ultraviolet absorbers include benzotriazole-based ultraviolet absorbers, benzoate-based ultraviolet absorbers, benzophenone-based ultraviolet absorbers, and triazine-based ultraviolet absorbers. Moreover, usable examples of light stabilizers include hindered amine-based light stabilizers. Furthermore, when contamination control performance and Sellotape (registered trademark) mold-release characteristics are required, a release agent having a silicone skeleton can be added. In this case, the type of release agent is not limited; however, the use of a silicone release agent having an end functional group that is reactive with the resin composition can improve contamination control performance and the durability of Sellotape mold-release characteristics.

(Transparent Resin Layer)

In particular, when abrasion resistance is required as a characteristic of the decorative material 1, a transparent resin layer (not shown) can be provided between the pattern ink layer 4 and the first gloss-adjusting layer 5. As the transparent resin layer, for example, a resin composition including an olefin-based resin as a main component is preferably used. Examples of the olefin-based resin include polypropylene, polyethylene, and polybutene; as well as those obtained by homopolymerization or copolymerization of two or more α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene); and those obtained by copolymerization of ethylene or α-olefins with other monomers, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer. In particular, in order to further improve surface strength, highly crystalline polypropylene is preferably used.

Furthermore, the transparent resin layer may contain additives, such as a heat stabilizer, an ultraviolet absorber, a light stabilizer, an antiblocking agent, a catalyst scavenger, and a coloring agent. These additives can be suitably selected from known additives. The transparent resin layer can be formed by various lamination methods, such as a method using thermal pressure, an extrusion lamination method, and a dry lamination method.

(Effects and Others)

(1) As described above, in the decorative material 1 of the present embodiment, the gloss-adjusting layer with lower gloss contains a matting agent having an average particle diameter of 6.0 μm or more and 15.0 μm or less.

With this configuration, the average particle diameter of the matting agent in the gloss-adjusting layer with lower gloss, i.e., the gloss-adjusting layer whose scratch resistance is likely to be low, can be set within an optimal range in which the gloss-adjusting layer has improved or even excellent scratch resistance and designability. In this manner, the scratch resistance and designability of the entire decorative material 1 can be improved. Thus, a decorative material 1 having improved or even excellent scratch resistance and designability can be provided.

With a configuration in which a first gloss-adjusting layer 5 covers the entire surface of a substrate 2, and a second gloss-adjusting layer 6 covers only part of the first gloss-adjusting layer 5, as with the decorative material 1 of the present embodiment, the first gloss-adjusting layer 5 is also exposed to the surface of the decorative material 1; therefore, in order to achieve a decorative material 1 having high scratch resistance, it appears to be necessary to improve the scratch resistance of both the first and second gloss-adjusting layers 5 and 6. However, as a result of extensive studies, the present inventors found that the deterioration tendency of scratch resistance was approximately proportional to the content of the matting agent; and that the scratch resistance of the entire decorative material 1 could be dramatically improved by improving the scratch resistance of only the gloss-adjusting layer with lower gloss, whose scratch resistance was likely to be deteriorated, without improving the scratch resistance of both the first and second gloss-adjusting layers 5 and 6. Based on these findings, the average particle diameter of the matting agent in the gloss-adjusting layer with lower gloss is set within the above optimal range.

Of course, the gloss-adjusting layer with higher gloss may also contain a matting agent having an average particle diameter of 6.0 μm or more and 15.0 μm or less.

(2) Moreover, in the decorative material 1 of the present embodiment, the thickness of the gloss-adjusting layer with lower gloss is 1 μm or more and 18 μm or less, and is 1.2 times or less the particle diameter of the matting agent.

With this configuration, part of the matting agent can be exposed from the surface, and scratch resistance can be more reliably improved.

(3) In this case, the thickness of the gloss-adjusting layer with lower gloss is preferably ⅓ or more of the particle diameter of the matting agent.

With this configuration, removal of the matting agent can be prevented, and scratch resistance can be more reliably improved.

(4) Moreover, in the decorative material 1 of the present embodiment, the design pattern of the pattern ink layer 4 is synchronized with the gloss of the second gloss-adjusting layer 6.

With this configuration, the designability due to the second gloss-adjusting layer 6 can be added to the designability due to the pattern ink layer 4, so that a decorative material 1 having a high-grade design expression close to that of natural wood or the like can be formed.

(5) Furthermore, in the decorative material 1 of the present embodiment, a matting agent including an inorganic material having a high matting effect is used.

With this configuration, the gloss of the gloss-adjusting layer can be significantly reduced. Accordingly, the difference between the gloss of the first gloss-adjusting layer 5 and the gloss of the second gloss-adjusting layer 6 can be increased, and the impression of unevenness to be obtained can be enhanced. An improved or even excellent design expression of greater depth can be thereby achieved.

(6) Moreover, in the decorative material 1 of the present embodiment, silica or glass is used as an inorganic material that constitutes the matting agent.

With this configuration, the matting effect can be improved, and a gloss-adjusting layer with much lower gloss can be formed.

(Modifications)

Figure 2:
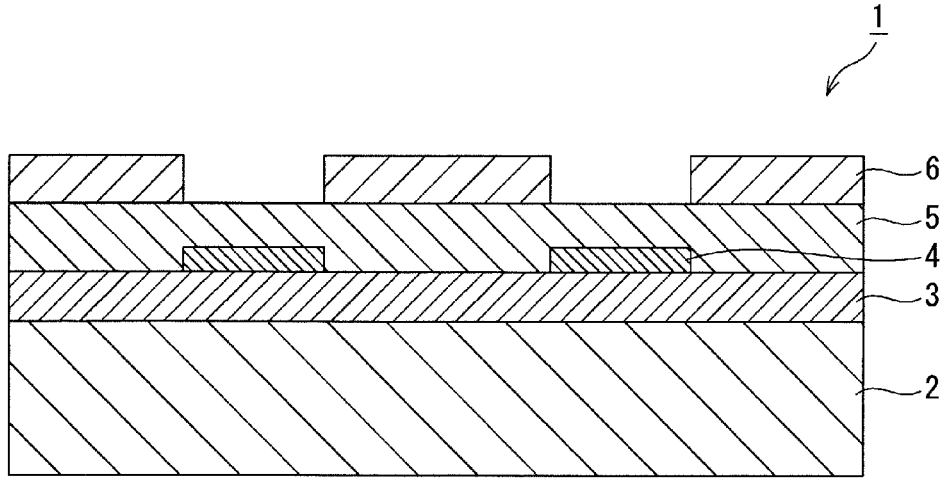
FIG. 2 is a cross-sectional view showing a modification of the decorative material.

(1) The above description shows an example in which the second gloss-adjusting layer 6 is formed in a portion overlapping the pattern ink layer 4, and the design pattern of the pattern ink layer 4 is synchronized with the gloss of the second gloss-adjusting layer 6; however, other structures can also be employed. For example, as shown in FIG. 2, the second gloss-adjusting layer 6 may be formed in a portion other than directly above the pattern ink layer 4, and the design pattern of the pattern ink layer 4 may be synchronized with the gloss of the first gloss-adjusting layer 5. In this case, the gloss of the exposed first gloss-adjusting layer 5 is imparted to the design pattern of the pattern ink layer 4, so that the designability due to the first gloss-adjusting layer 5 can be added to the designability due to the pattern ink layer 4. Therefore, it is possible to form a decorative material 1 having a high-grade design expression close to that of natural wood or natural stone.

(2) Regarding synchronization, two layers to be synchronized may not overlap each other so that they completely match with each other in the thickness direction. Synchronization may be adjusted so that, for example, the second gloss-adjusting layer 6 overlaps 70% or more of the other layer to be synchronized in the width direction.

EXAMPLES

Specific Examples of the decorative material 1 according to the present embodiment are described below.

Example 1

In Example 1, impregnated paper having a basis weight of 50 g/m$^2$ (GFR-506, produced by Kohjin Co., Ltd.) was used as a substrate 2. Then, a base solid ink layer 3 and a pattern ink layer 4 were formed in this order on one side of the substrate 2 using oily nitrocellulose resin gravure printing ink where each color was of PCNT (PCRNT), produced by Toyo Ink Co., Ltd. The design pattern of the pattern ink layer 4 was a wood grain pattern.

Subsequently, ink for a first gloss-adjusting layer 5 was applied to the substrate 2, on which the pattern ink layer 4 was formed, so as to cover the entire surface of one side of the substrate 2, thereby forming the first gloss-adjusting layer 5. The ink was composed of 20 parts by mass of acrylic polyol (6KW-700, produced by Taisei Fine Chemical Co., Ltd.), 10 parts by mass of silica-based matting agent (Sylysia 370, produced by Fuji Silysia Chemical Ltd.), 5 parts by mass of UV radical initiator (IRGACURE 184, produced by BASF), and 6 parts by mass of polyisocyanate (UR190B curing agent, produced by Toyo Ink Co., Ltd), relative to 100 parts by mass of dipentaerythritol hexaacrylate. The coating amount of the ink was set to 5 g/m$^2$. Next, ink for a second gloss-adjusting layer 6 was applied to a portion of the first gloss-adjusting layer 5 directly above the pattern ink layer 4, thereby forming the second gloss-adjusting layer 6. The ink was composed of 5 parts by mass of silica-based matting agent (Sylysia 370, produced by Fuji Silysia Chemical Ltd.) and 5 parts by mass of UV radical initiator (IRGACURE 184, produced by BASF) relative to 100 parts by mass of dipentaerythritol hexaacrylate. The average particle diameter of the matting agent was 6.4 μm.

Example 2

In Example 2, a silica-based matting agent (CARPLEX CS-801, produced by Evonik Japan Co., Ltd.) was used as the matting agent in the ink for the first gloss-adjusting layer 5, and the matting agent in the ink for the second gloss-adjusting layer 6. The average particle diameter of the matting agent was 7.8 μm. Other configurations were the same as those of Example 1.

Example 3

In Example 3, a silica-based matting agent (Mizukasil P-510, produced by Mizusawa Industrial Chemicals, Ltd.) was used as the matting agent in the ink for the first gloss-adjusting layer 5, and the matting agent in the ink for the second gloss-adjusting layer 6. The average particle diameter of the matting agent was 10.0 μm. Other configurations were the same as those of Example 1.

Example 4

In Example 4, a silica-based matting agent (CARPLEX CS-801, produced by Evonik Japan Co., Ltd.) was used as the matting agent in the ink for the first gloss-adjusting layer 5, and a matting agent was not added to the ink for the second gloss-adjusting layer 6. Other configurations were the same as those of Example 1.

Example 5

In Example 5, 5 parts by mass of silica-based matting agent (Sylysia 370, produced by Fuji Silysia Chemical Ltd.) was used as the matting agent in the ink for the first gloss-adjusting layer 5, and 10 parts by mass of silica-based matting agent (CARPLEX CS-801, produced by Evonik Japan Co., Ltd.) was used as the matting agent in the ink for the second gloss-adjusting layer 6. Other configurations were the same as those of Example 1. In Example 5, because the amount of the matting agent used for the second gloss-adjusting layer was larger, the second gloss-adjusting layer 6 was a gloss-adjusting layer with lower gloss.

Example 6

In Example 6, 10 parts by mass of silica-based matting agent (CARPLEX CS-801, produced by Evonik Japan Co., Ltd.) was used as the matting agent in the ink for the second gloss-adjusting layer 6, and a matting agent was not added to the ink for the first gloss-adjusting layer 5.

Other configurations were the same as those of Example 1.

Comparative Example 1

In Comparative Example 1, a silica-based matting agent (Mizukasil P-707, produced by Mizusawa Industrial Chemicals, Ltd.) was used as the matting agent in the ink for the first gloss-adjusting layer 5, and the matting agent in the ink for the second gloss-adjusting layer 6. The particle diameter of the matting agent was 4.0 μm (<6.0 μm). Other configurations were the same as those of Example 1.

Comparative Example 2

In Comparative Example 2, a silica-based matting agent (Mizukasil P-78F, produced by Mizusawa Industrial Chemicals, Ltd.) was used as the matting agent in the ink for the first gloss-adjusting layer 5, and the matting agent in the ink for the second gloss-adjusting layer 6. The particle diameter of the matting agent was 18.0 µm (>15.0 µm). Other configurations were the same as those of Example 1.

(Evaluation)

Examples 1 to 6 and Comparative Examples 1 and 2 above were evaluated for designability and scratch resistance.

(Designability)

The cloudiness of the gloss-adjusting layer (how the print pattern appeared), and the impression of unevenness due to the difference in gloss were evaluated by visual observation. When there were no problems, this case was evaluated as "++"; when cloudiness was slightly observed, or when the impression of unevenness was slightly weak, these cases were evaluated as "+"; and when cloudiness was clearly observed, or when the impression of unevenness was weak, these cases were evaluated as "−." (Scratch Resistance)

After each decorative material 1 was subjected to a scratch resistance test by reciprocating 30 times with steel wool (#0000) at a load of 500 [g/m$^2$], the presence of scratches and glossiness changes on the surface of the decorative material 1 were evaluated by visual observation. When neither scratches nor glossiness changes were observed, this case was evaluated as "++"; when scratches and glossiness changes were slightly observed, this case was evaluated as "+"; and when large scratches and glossiness changes were observed, this case was evaluated as "−."

Table 1 shows these evaluation results. The particle diameter shown in Table 1 is average particle diameter.

TABLE 1

| | First gloss-adjusting layer | | Second gloss-adjusting layer | | | |
|---|---|---|---|---|---|---|
| | Particle diameter of matting agent | Amount | Particle diameter of matting agent | Amount | Designability | Scratch resistance |
| Example 1 | 6.4 | 10 | 6.4 | 5 | ++ | ++ |
| Example 2 | 7.8 | 10 | 7.8 | 5 | ++ | ++ |
| Example 3 | 10.0 | 10 | 10.0 | 5 | ++ | ++ |
| Example 4 | 7.8 | 10 | — | — | ++ | ++ |
| Example 5 | 6.4 | 5 | 7.8 | 10 | ++ | ++ |
| Example 6 | — | — | 7.8 | 10 | ++ | ++ |
| Comparative Example 1 | 4.0 | 10 | 4.0 | 5 | ++ | − |
| Comparative Example 2 | 18.0 | 10 | 18.0 | 5 | − | − |

With the decorative materials 1 of Examples 1 to 6, the scratch resistance and the designability were both evaluated as "++," as shown in Table 1.

In contrast, with the decorative material 1 of Comparative Example 1, the designability was evaluated as "++"; however, the scratch resistance was evaluated as "−." The reason that the scratch resistance was evaluated as "−" is considered to be that due to the overly small average particle diameter of the matting agent, the steel wool was easily brought into contact with the resin parts of the first and second gloss-adjusting layers 5 and 6. In Comparative Example 2, the scratch resistance and the designability were both evaluated as "−." The reason that the scratch resistance was evaluated as "−" is considered to be that due to the overly large average particle diameter of the matting agent, the exposure of the matting agent from the surfaces of the first and second gloss-adjusting layers 5 and 6 increased, so that the matting agent was easily removed. Further, the reason that the designability was evaluated as "−" is considered that light scattering on the surfaces of the first and second gloss-adjusting layers 5 and 6 was large, which led to cloudiness in the first and second gloss-adjusting layers 5 and 6; and that visual particle recognition was increased, so that the impression of unevenness due to the difference in gloss was impaired.

The above results revealed that the decorative materials of Examples 1 to 6, in which the average particle diameter of the matting agent in the first and second gloss-adjusting layers 5 and 6 was within an optimal range, were decorative materials 1 having improved or even excellent designability and scratch resistance.

The decorative material 1 of the present invention is not limited to the above embodiments and Examples, and various modifications can be made within a range that does not impair the features of the invention.

REFERENCE SIGNS LIST

1 . . . Decorative material; 2 . . . Substrate; 3 . . . Base solid ink layer; 4 . . . Pattern ink layer; 5 . . . First gloss-adjusting layer; 6 . . . Second gloss-adjusting layer.

What is claimed is:

1. A decorative material comprising:
    a first gloss-adjusting layer provided on a substrate, and
    a second gloss-adjusting layer partially provided on the first gloss-adjusting layer, and having gloss that is different from that of the first gloss-adjusting layer;
    wherein each of the first gloss-adjusting layer and the second gloss-adjusting layer contains a matting agent having an average particle diameter of 6.0 µm or more and 15.0 µm or less in an amount of 5 parts by mass or more and 40 parts or less relative to 100 parts of a resin composition of the respective gloss-adjusting layer;
    the gloss-adjusting layer with lower gloss of the first gloss-adjusting layer and the second gloss-adjusting layer has a thickness of 1 µm or more and 18 µm or less, where the thickness is 1.2 times or less the particle diameter of the matting agent contained in the gloss-adjusting layer with lower gloss, and
    the amount of the matting agent in the second gloss-adjusting layer is greater than in the first gloss-adjusting layer.

2. The decorative material of claim 1, wherein the thickness of the gloss-adjusting layer with lower gloss is ⅓ or more of the particle diameter of the matting agent contained in the gloss-adjusting layer with lower gloss.

3. The decorative material of claim 1, wherein the matting agent comprises an inorganic material.

4. The decorative material of claim 3, wherein the inorganic material is silica or glass.

5. The decorative material of claim 1, wherein the decorative material further comprises a pattern ink layer provided between the substrate and the first gloss-adjusting layer;
    the second gloss-adjusting layer is formed in a portion overlapping the pattern ink layer; and
    a design pattern of the pattern ink layer is synchronized with the gloss of the second gloss-adjusting layer.

6. The decorative material of claim 1, wherein the decorative material further comprises a pattern ink layer provided between the substrate and the first gloss-adjusting layer;
    the first gloss-adjusting layer entirely covers a surface of the substrate on a first gloss-adjusting layer side;

the second gloss-adjusting layer is formed in a portion overlapping a portion other than a portion directly above the pattern ink layer; and a design pattern of the pattern ink layer is synchronized with the gloss of the first gloss-adjusting layer.

7. The decorative layer of claim 1, wherein the gloss-adjusting layer with lower gloss of the first gloss-adjusting layer and the second gloss-adjusting layer has the amount of the matting agent of 10 parts by mass or more and 30 parts by mass or less relative to 100 parts by of the resin composition of the gloss-adjusting layer with lower gloss.

8. The decorative composition of claim 1, wherein the matting agent is silica.

9. A decorative material comprising:

a first gloss-adjusting layer provided on a substrate, and a second gloss-adjusting layer partially provided on the first gloss-adjusting layer, and having gloss that is different from that of the first gloss-adjusting layer;

wherein, of the first gloss-adjusting layer and the second gloss-adjusting layer, at least one with lower gloss contains a silica matting agent, where the silica matting agent contained in the gloss-adjusting layer with lower gloss has an average particle diameter of 6.0 μm or more and 15.0 μm or less;

the gloss-adjusting layer with lower gloss has a thickness of 1 μm or more and 18 μm or less, where the thickness is 1.2 times or less the particle diameter of the silica matting agent contained in the gloss-adjusting layer with lower gloss; and the second gloss-adjusting material is the gloss-adjusting layer with lower gloss.

10. The decorative material of claim 9, wherein each of the first gloss-adjusting layer and the second gloss-adjusting layer contains the silica matting agent in an amount of 5 parts by mass or more and 40 parts or less relative to 100 parts of a resin composition of the respective gloss-adjusting layer.

11. The decorative material of claim 9, wherein the second gloss-adjusting layer has the amount of the matting agent of 10 parts by mass or more and 30 parts by mass or less relative to 100 parts of the resin composition of the second gloss-adjusting layer.

12. The decorative material of claim 11, wherein the first gloss-adjusting layer does not contain the silica matting agent.

13. The decorative material of claim 11, wherein the first gloss-adjusting layer contains the silica matting agent in the amount of at least 5 parts relative to 100 parts of the resin composition of the first gloss-adjusting layer.

* * * * *